United States Patent
Konno et al.

(10) Patent No.: US 6,884,192 B2
(45) Date of Patent: *Apr. 26, 2005

(54) MOVABLE GUIDE FOR TRANSMISSION DEVICE

(75) Inventors: Masahiko Konno, Osaka (JP); Toshifumi Satoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 137 days.

This patent is subject to a terminal disclaimer.

(21) Appl. No.: 10/341,043

(22) Filed: Jan. 13, 2003

(65) Prior Publication Data

US 2003/0139237 A1 Jul. 24, 2003

(30) Foreign Application Priority Data

Jan. 23, 2002 (JP) .......................... 2002-014389

(51) Int. Cl.[7] ............................................... F16H 7/08
(52) U.S. Cl. ........................................ 474/111; 474/140
(58) Field of Search .............................. 474/101, 109, 474/111, 123, 140, 148

(56) References Cited

U.S. PATENT DOCUMENTS 4,826,468 A * 5/1989 Friedrichs .................. 474/101

6,645,102 B1 * 11/2003 Kumakura ................. 474/111

FOREIGN PATENT DOCUMENTS

| EP | 0 867 639 A1 | 9/1998 | |
|----|----|----|----|
| GB | 2 371 613 A | 7/2002 | |
| JP | 11-201246 | * 7/1999 | ............. F16H/7/08 |
| JP | 3253951 | 11/2001 | |

* cited by examiner

Primary Examiner—David A. Bucci
Assistant Examiner—Vicky A. Johnson
(74) Attorney, Agent, or Firm—Howson & Howson

(57) ABSTRACT

In a movable guide for transmission device in which a guide body is formed from a synthetic resin and comprises a chain-contacting shoe and a plate-receiving portion formed as a unit with the shoe on the back side thereof, the plate-receiving portion has plural, longitudinally extending slots, each receiving a reinforcing plate. The plural reinforcing plates improve the bending rigidity, toughness, strength and wear properties of the guide, prevent falling down of the guide and guide torsion, ensure stable travel of the chain, and prevent running of the chain off the guide in a widthwise direction. Improved compactness of the guide and of the overall mechanism, is made possible by the use of plural plates. The plates can be connected to one another by a tensioner-contacting portion, formed as a unit with the plates.

4 Claims, 7 Drawing Sheets

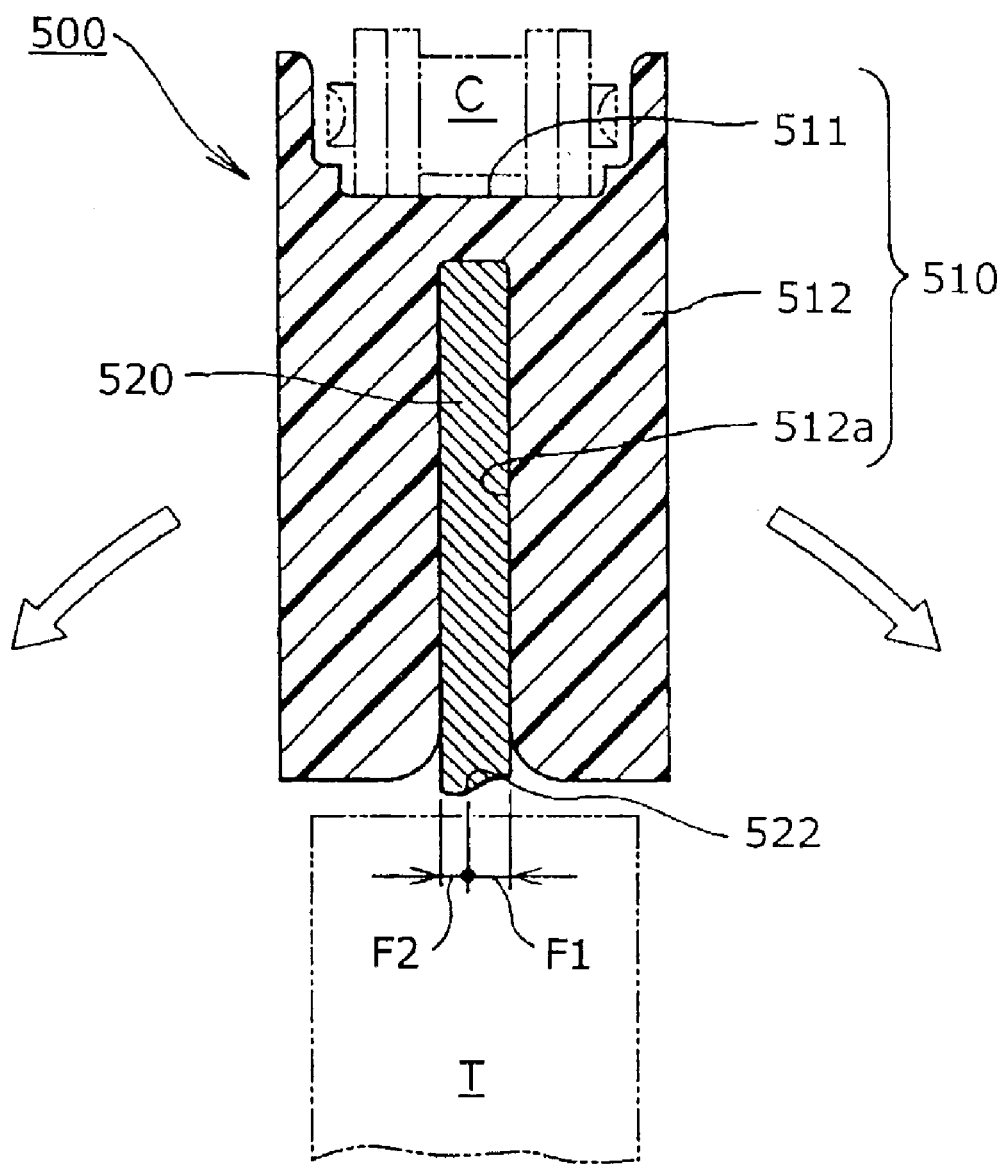

MOVABLE GUIDE FOR TRANSMISSION DEVICE

FIELD OF THE INVENTION

This invention relates to a sliding contact guide for a power transmission utilizing an endless, circulating, flexible power transmission medium. It relates, for example, to a guide in a chain drive transmission, in which a chain transmits power from a driving sprocket to a driven sprocket, or to a guide in a belt drive transmission, in which a belt transmits power from a driving pulley to a driven pulley.

BACKGROUND OF THE INVENTION

In general, as shown in FIG. 6, a chain or belt transmission device for valve timing in an internal combustion engine, or for transmitting rotational power in another drive mechanism, includes a chain or belt C, which transmits power from a driving sprocket or pulley S1 to one or more driven sprockets or pulleys S2. The transmission includes a pivotally mounted, movable sliding contact guide Ga, which cooperates with a tensioner T, and a fixed sliding contact guide Gb. The movable guide and the fixed guide are attached to a frame E of the engine or other drive mechanism by suitable pins P, or by bolts or similar mountings. The guides make sliding contact with the chain or belt C, and prevent vibration of the chain or belt both in the plane of its traveling path (which is usually vertical), and in the transverse direction.

FIG. 7 shows a plastic movable guide 500, of the kind disclosed in the specification of Japanese Patent Application No. 382798/2000. The guide 500 comprises a guide body 510, including a shoe 511 having a front surface of which a chain, belt or other flexible power transmission medium C slides, and a plate-receiving portion 512, extending along the longitudinal direction of the guide on the back side of the shoe 511. The shoe and plate-receiving portions are integrally molded as a unit from a synthetic resin. The guide also includes a reinforcing plate 520 composed of a rigid material such as a rolled sheet material, a fiber-reinforced resin or the like, which reinforces the guide body 510. The plate is fitted into a slot 512a opening at an edge of said plate-receiving portion 512, facing away from the shoe and extending along the longitudinal direction of the guide.

A mounting hole 512b is provided in a boss 512c formed on the plate-receiving portion 512 adjacent one end of the guide body. The mounting hole allows the guide to be mounted on the frame of an engine or other machine. A hole 521 is also provided in the reinforcing plate adjacent one end thereof. When the reinforcing plate is inserted into the slot in the plate-receiving portion of the guide body, holes 521 and 512 are in register with each other so that they can both fit onto a pivot pin P, or on a mounting bolt or the like.

A plurality of reinforcing ribs 512d, reinforce the guide body. A tensioner-contacting portion 512e is formed on the plate-receiving portion adjacent the end of the guide body remote from the mounting hole 512b. The tensioner-contacting portion makes contact with the plunger of a tensioner T (FIG. 6), mounted on the frame of the engine E, to control tension in the power transmission medium.

The guide body 510 is produced by integrally molding the shoe 511 and the plate-receiving portion 512 as a unit from a synthetic resin. Accordingly, the chain or other flexible transmission medium slides along the guide body itself, and it is not necessary to provide a separate shoe. Thus the number of parts, and the number of production steps, is reduced. Further, since the reinforcing plate 520 is fitted into the slot 512a, the bending rigidity, toughness, and strength of the guide are significantly improved.

The reinforcing plate 520 is produced by pressing a rolled steel sheet or molding a fiber reinforced resin. However, the practical limit to the thickness of the reinforcing plate is about 4.5 mm. Consequently, it is not possible to improve the bending rigidity, toughness, and strength of the entire guide beyond what is afforded by a plate having a thickness of about 4.5 mm, and there is no room for increasing the largest allowable load in a conventional movable guide.

The reinforcing plate 520 substantially bears the load exerted as a result of tension in the chain C. As shown in FIG. 8, the reinforcing plate 520 is unstable in the direction of the width of the guide. Falling down as shown in FIG. 9(b), or "guide torsion" as shown in FIG. 10(b), are liable to occur, so that traveling movement of the chain becomes unstable.

As shown in FIG. 8, when the reinforcing plate 520 is produced by pressing a rolled steel sheet or the like, a portion F1 of the edge of the reinforcing plate may not be accurately perpendicular to the side faces, and the load imparted to the plate by the tension in a chain must be borne by the narrow remaining portion F2. As a result, excessive pressure is applied to portion F2. Moreover, the chain tends to move widthwise off the guide, which causes instability in the movement of the chain. The contact portion 522 is liable to wear out prematurely, and the frame mounting hole 512b in the guide body 510 and the hole 521 in the reinforcing plate 520 are also liable to wear out prematurely due to instability. Thus, a reinforcing plate produced by pressing a rolled steel sheet cannot be used satisfactorily under the heavy load conditions encountered in an engine, such as a diesel engine, in which two timing chains are arranged in parallel to each other.

In order to meet high load imposed on the tensioner by the tension of a chain under the rigorous transmission conditions encountered in an engine, the modulus the guide may be increased by increasing the height H of the guide body 510 and reinforcing plate 520 as shown in FIG. 6. The height H may be increased so that the plate-receiving portion of the guide body is as shown by the broken line in FIG. 6. However, the space available in the engine limits the height H, and a reinforcing plate 520 having increased height cannot be used in engines designed in accordance with the recent trend toward increased load and greater compactness.

Accordingly, an object of the invention is to solve one or more of the above-mentioned problems. Another object of the invention is to provide a movable guide for that can maintain stable travel of the transmission medium, and avoid running of the transmission medium off the guide in the widthwise direction. Other objects are to increase load capacity and compactness in a transmission device by significantly increasing bending rigidity, toughness, strength, and wear-resistance of the entire guide, and to prevent falling down of the guide and guide torsion.

SUMMARY OF THE INVENTION

A preferred movable guide in accordance with the invention comprises an elongated synthetic resin guide body including a shoe having a front surface arranged to contact a flexible transmission medium and a plate-receiving portion provided on the back side of the shoe and extending along the longitudinal direction of the guide body. The plate-receiving portion has a plurality of slots also extending along the longitudinal direction of the guide body and opening in a direction facing away from the shoe. The guide has a plurality of reinforcing plates respectively fitted into the slots and arranged in parallel to one another along the longitudinal direction of the guide.

Preferably, each reinforcing plate has a mounting hole adjacent one end thereof, and the plate-receiving portion also has a mounting hole adjacent one end thereof. The mounting holes are aligned with one another when the reinforcing plates are fitted into the slots so that the mounting holes can receive a mounting shaft for pivotally mounting the guide.

The plate-receiving portion has a rearwardly facing surface facing away from the shoe, and the slots have openings in the rearwardly facing surface. In one embodiment of the guide, a tensioner-contacting portion connects the plates to one another and extends across at least a portion of the rearwardly facing surface.

There is no particular limitation on the materials of the synthetic resin guide body. However, nylon 6, nylon 66, nylon 46, all aromatic nylons and the like, known as engineering plastics, have excellent wear properties and lubricating properties, and are preferred. When bending rigidity, toughness and strength are required, fiber-reinforced plastics are preferred. When such materials are used, the sliding contact surface of the guide can function as a shoe.

For the reinforcing plates, again there are no special limitations on the materials which may be used. However, iron-based metals, nonferrous metals such as aluminum, magnesium, titanium and the like, engineering plastics, fiber-reinforced plastics and the like, having good bending rigidity and strength are preferred. The forms of the reinforcing plates are not especially limited so long as the plates can be fitted into slots in the plate-receiving portion of the guide body to reinforce the guide body. For example, the reinforcing plate may have one or more cut-out openings or weight-reducing windows.

The use of plural reinforcing plates in the guide suppresses widthwise vibration of the flexible transmission medium, and also prevents running of the transmission medium off the guide in the widthwise direction.

When a tensioner-contacting portion connects the plates to one another and extends across at least a portion of the rearwardly facing surface of the plate-receiving portion, the guide becomes particularly stable and strongly resistant to the effects of widthwise forces. The tensioner-contacting portion which connects the plates not only ensures a stable guide position, but also avoids guide torsion and falling down of the guide, and ensures a stable travel of the flexible transmission medium.

The provision of aligned mounting holes in the plate-receiving portion of the guide body and in the reinforcing plates prevents the plates from becoming dislodged from the guide body and suppresses vibrational contact between the guide body and the reinforcing plates, which is otherwise produced as a result of movement of a chain, belt or the like along the guide.

BRIEF DESCRIPTION OF THE DRAWINGS

FIG. 8 is transverse cross-sectional view of the conventional movable guide;

FIG. 9($b$) is a cross-sectional view of guide of FIG. 9($a$);

FIG. 10($b$) is a cross-sectional view of guide of FIG. 10($a$).

DETAILED DESCRIPTION OF THE PREFERRED EMBODIMENTS

Figure 1:
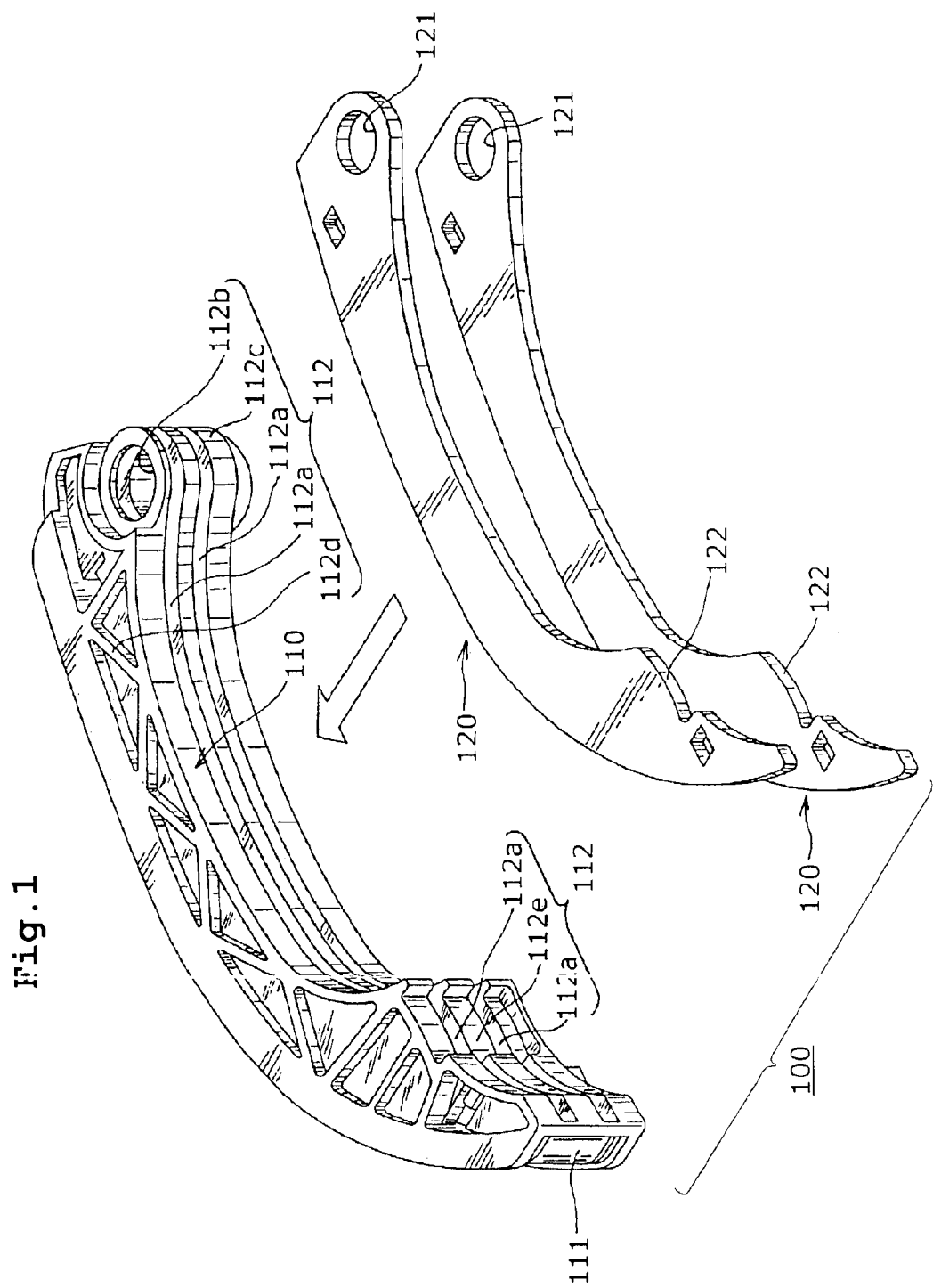
FIG. 1 is an exploded perspective view of a movable guide according to a first embodiment of the invention.

The movable guide 100, shown in FIG. 1, is designed to be pivotally attached to an engine on a mounting shaft in order serve as a tensioner lever to control tension in a traveling chain. The guide 100 comprises an integrally molded, synthetic resin guide body 110, and two metallic reinforcing plates 120 punched from a steel sheet. The guide is produced by inserting the two reinforcing plates 120 into slots 112$a$ in the synthetic resin guide body 110 in the direction illustrated by the arrow.

The guide body 110 comprises a shoe 111 having transmission medium-contacting surface on which a chain, belt or the like slides, and plate-receiving portions 112 provided on the back sides of the shoe 111 and extending along the longitudinal direction of the guide. Further, the plate-receiving slots 112$a$ have their openings facing away from the shoe, in a direction opposite to the direction in which the transmission medium-contacting surface faces. The slots extend parallel to each other along the longitudinal direction of the guide. A mounting hole 112$b$ is disposed in a boss 112$c$ formed near one end of the guide body for pivotal mounting on a pin, bolt, or similar mounting device (not shown) attached to the frame of an engine. The guide body has a plurality of reinforcing ribs 112$d$, and a tensioner-contacting portion 112$e$.

Each of the two reinforcing plates 120 is provided with a hole 121 near one end thereof. When the plates are inserted in slots 112$a$, these holes 121 are aligned with one another and with mounting hole 112$b$ in the guide body so that a mounting bolt or pin is received through all of the holes, fastening the reinforcing plates to the guide body at one end thereof. Tensioner contacting portions 122 are provided on the reinforcing plates, for making contact with a tensioner (not shown) attached to the engine frame to control the tension in the flexible transmission medium. The pivoting pin or bolt, and the tensioner prevent the reinforcing plates 120 from being dislodged from the guide body 110.

Figure 2:
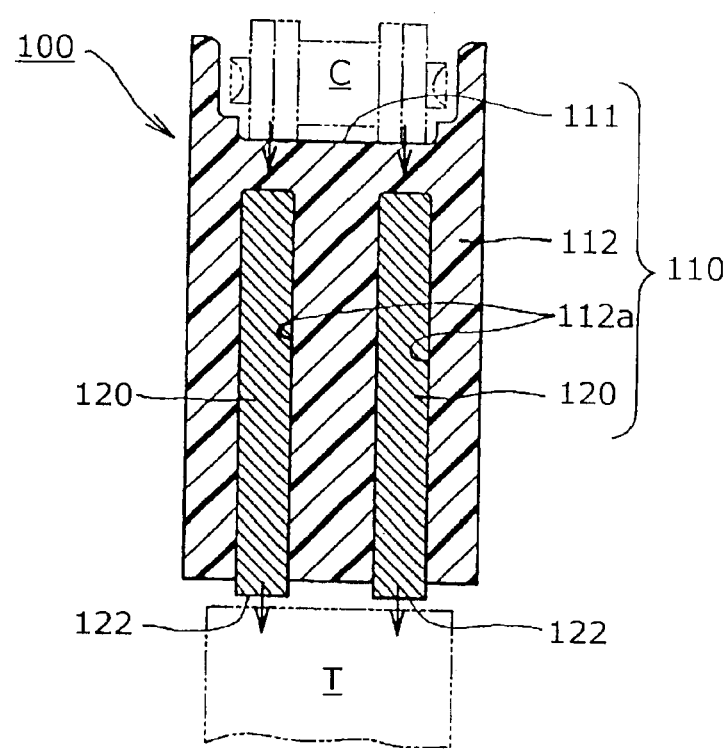
FIG. 2 is transverse cross-sectional view of the guide of FIG. 1.

The reinforcing plates can be slightly exposed as shown in FIG. 2, so that they extend slightly outside the plate-receiving portion of the guide body. However, because there are two such plates, even if the tensioner contacting portions 122 are rough, have narrow portions, or have portions not perpendicular to the side walls of the reinforcing plates stable chain travel can be ensured.

Even if coefficient of thermal expansion of the guide body 110 differs from that of the reinforcing plates 120, deformation and breakage do not occur because the reinforcing plates and the guide body are fastened together only at one end of the guide by the engagement of the holes 121 and 112b with a mounting pin or bolt. The reinforcing plates and guide body are otherwise free to expand and contract relative to each other in the longitudinal direction of the guide, so that deformation and breakage are prevented.

The load applied to the guide as a result of tension in the chain or other transmission medium is uniformly distributed to both of the two reinforcing plates 120. Therefore the bending rigidity, toughness, strength, and wear properties of the entire guide are significantly enhanced, and falling down of the guide and guide torsion are prevented. This ensures stable travel of the flexible transmission medium, without widthwise vibration and widthwise movement of the transmission medium off the guide. The guide in accordance with the invention the invention exhibits superior bending rigidity, strength and wear properties compared to those of a conventional die cast aluminum guide and the conventional guide having a single reinforcing plate.

Because falling down and torsion of the guide are prevented, excess wear at the mounting hole 112b of the guide body 110, and at the holes 121 of reinforcing plates 120, is suppressed, the load-bearing capability of the guide is enhanced, and a more compact guide, and therefore a more compact transmission device can be realized.

Figure 3:
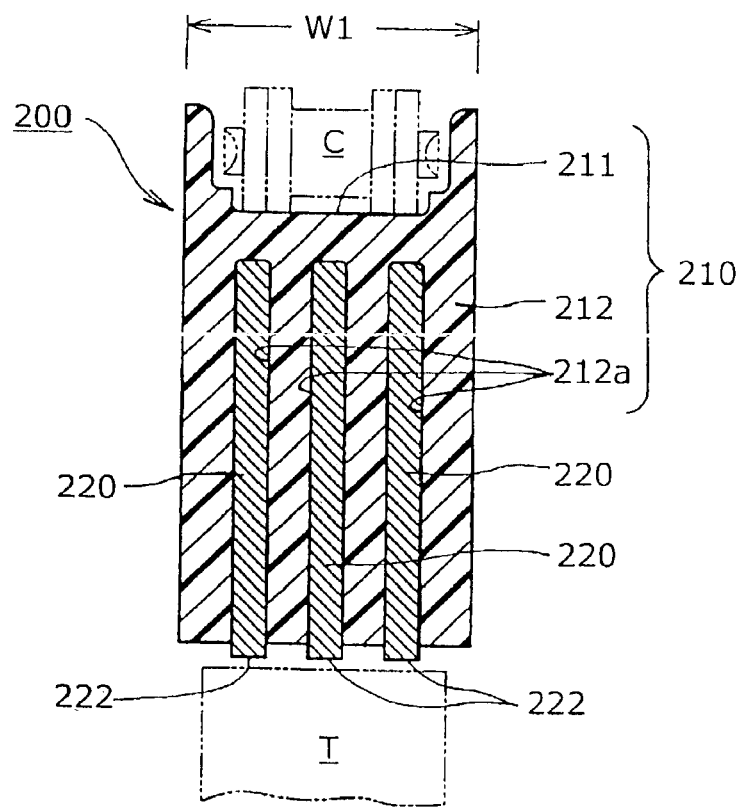
FIG. 3 is a transverse cross-sectional view of a guide in accordance with a second embodiment of the invention.

In the embodiment shown in FIG. 3, a movable guide 200 has a plate-receiving portion 212 having three parallel slots 212a and three reinforcing plates 220 fitted in the respective slots. Except for the number of plates and slots, the structure of the embodiment of FIG. 3 is substantially the same as that of the embodiment shown in FIGS. 1 and 2.

The guide 200 has further enhanced bending rigidity, toughness, strength and wear resistance. With the guide 200, as in the case of the guide 100, falling down of the guide and guide torsion can be prevented. The load-bearing capacity of the guide is further increased, and improved compactness of the guide and the overall transmission device can be realized.

Figure 4:
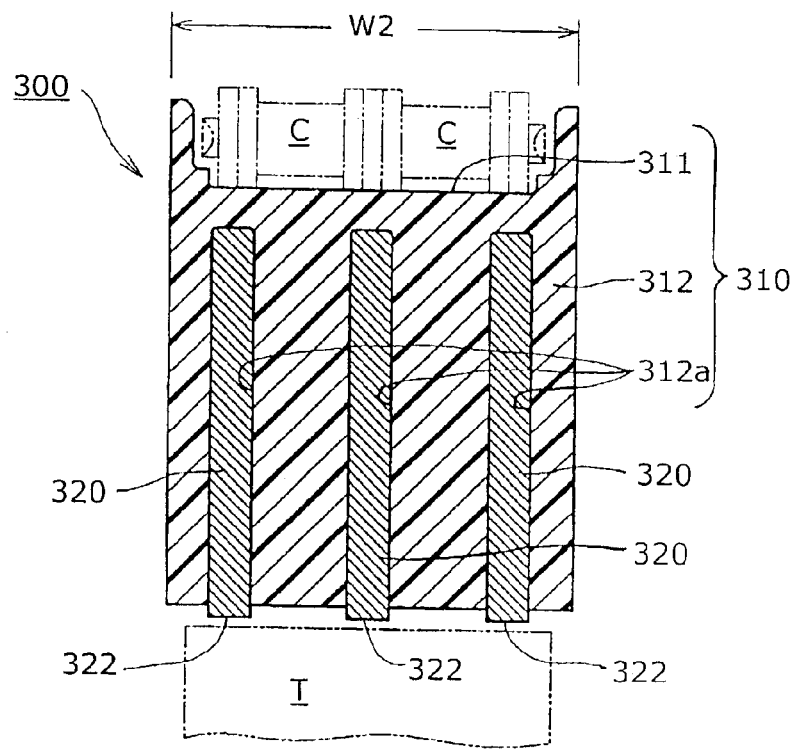
FIG. 4 is a is a transverse cross-sectional view of a guide in accordance with a third embodiment of the invention.

In a third embodiment of the invention, as shown in FIG. 4, a movable guide 300 has the same basic structure as that of the guide 200 of the second embodiment. Three parallel slots 312a are provided in a plate-receiving portion 312, and three reinforcing plates 320 are fitted in the respective slots. By increasing the width W1 of the guide in the synthetic resin guide body 210 in the guide 200 in FIG. 3 to a width W2 in FIG. 4, the guide can be made applicable to a high load type engine, such as a diesel engine, wherein two timing chains are arranged in parallel.

Figure 5:
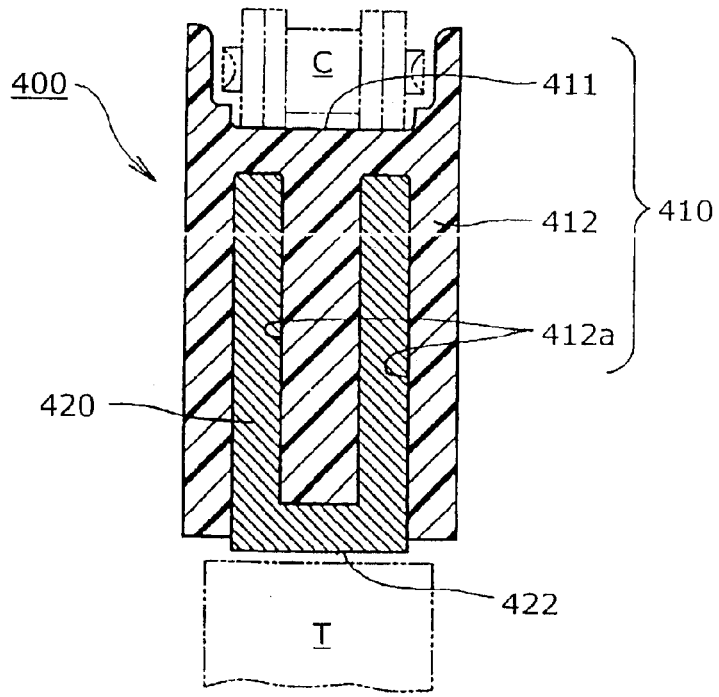
FIG. 5 is a is a transverse cross-sectional view of a guide in accordance with a fourth embodiment of the invention.
Figure 6:
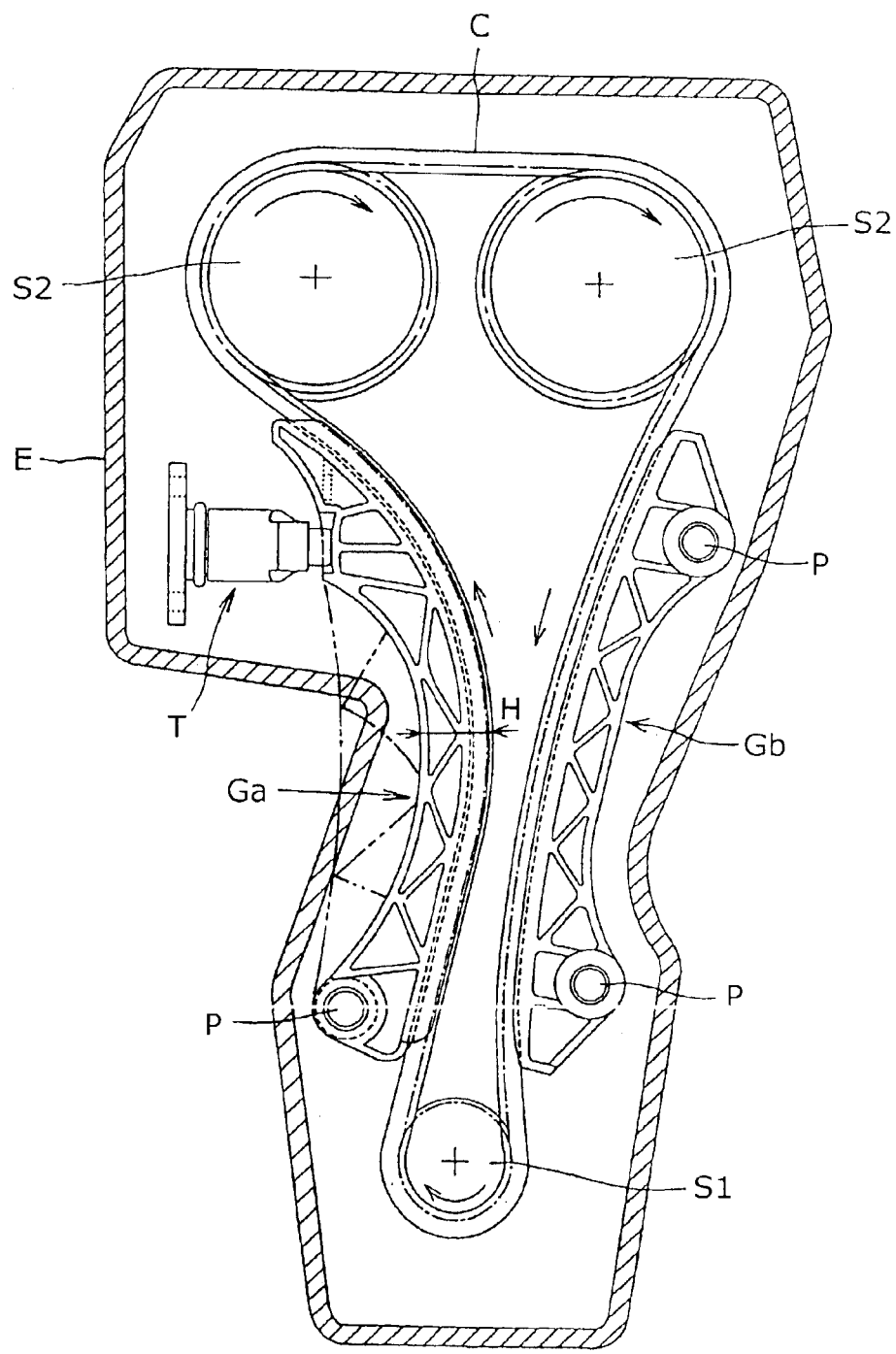
FIG. 6 is an elevational view showing a conventional movable guide arranged to maintain tension in the timing chain of a dual-cam internal combustion engine.
Figure 7:
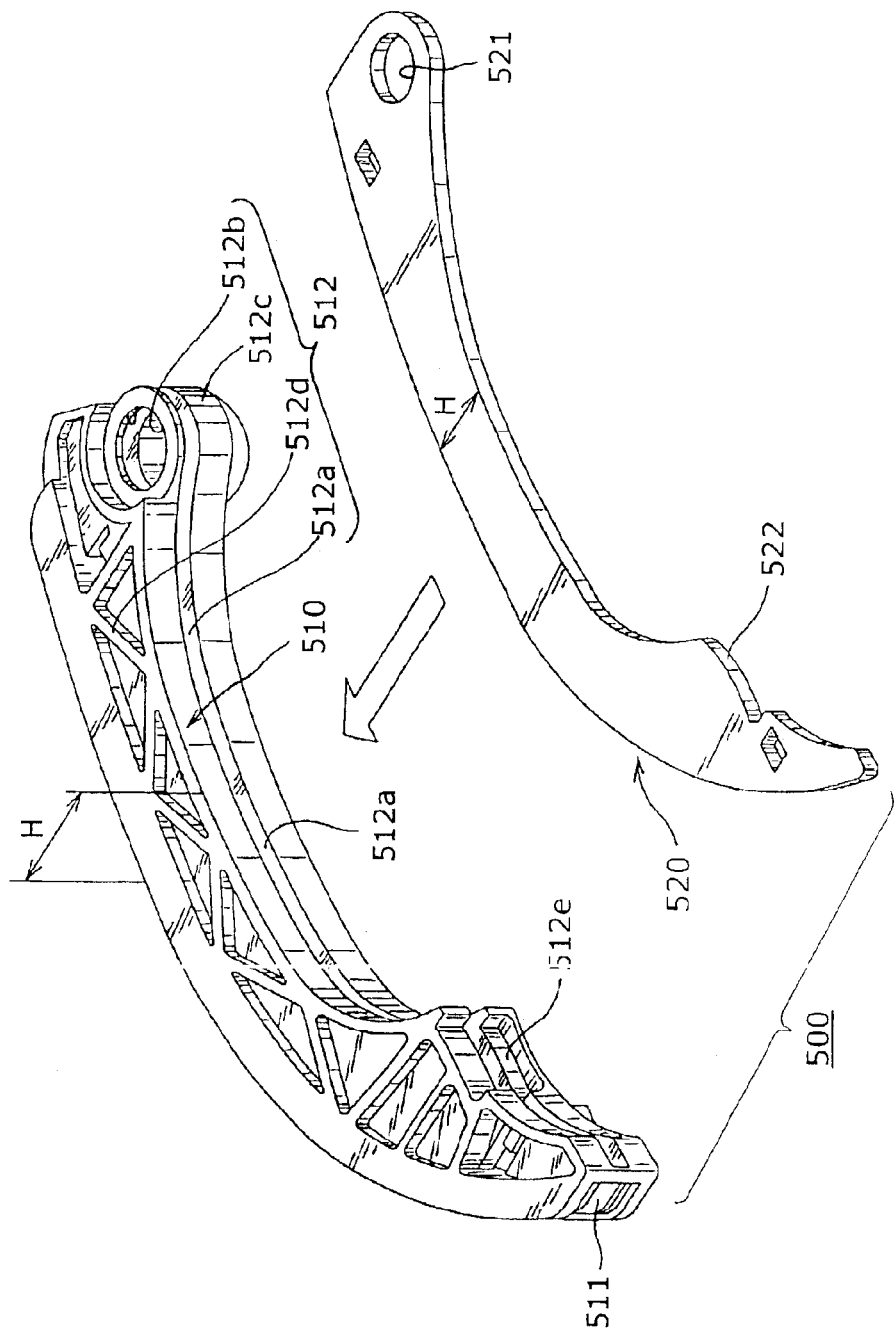
FIG. 7 is an exploded perspective view of a conventional movable guide.
Figure 9A:
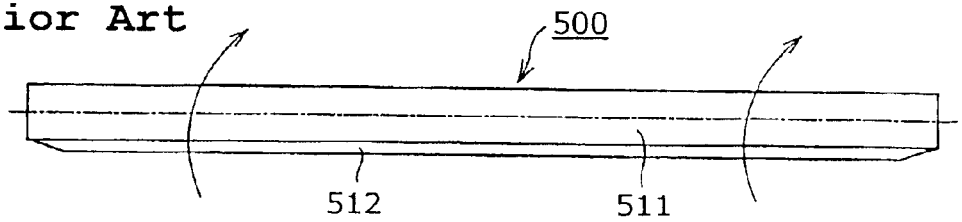
FIG. 9($a$) is a schematic top plan view illustrating the falling down movement of a conventional movable guide.
Figure 9B:
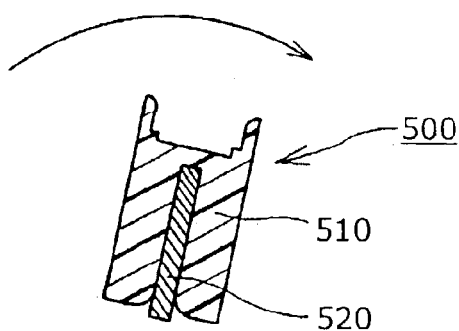
Figure 10A:
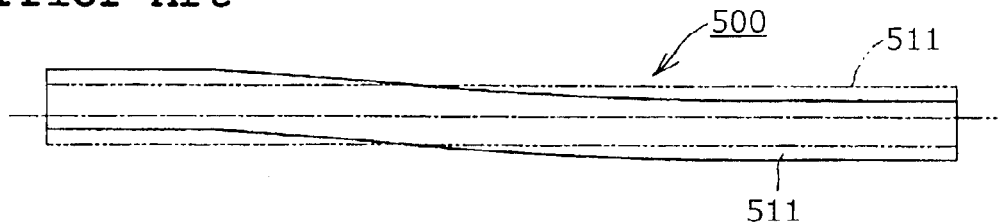
FIG. 10($a$) is a schematic top plan view illustrating torsion in a conventional movable guide.
Figure 10B:
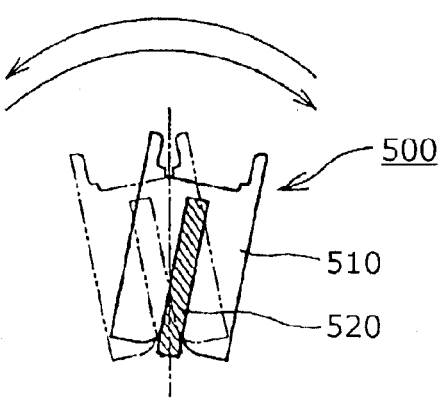

In a fourth embodiment of the invention, as shown in FIG. 5, a movable guide 400 has the same basic structure as that of the guide 100 in the first embodiment. However, the reinforcement 420 is a unitary structure comprising two plates respectively fitted into slots 412a and connected to each other by a transversely extending tensioner-engaging portion 422, which extends across the tensioner-facing surface of the plate-receiving portion of the tensioner body. Therefore, at the location of the tensioner-contacting part of the guide, the reinforcement 420 has a U-shaped cross-section. The tensioner-engaging portion 422 extends slightly beyond the openings of the slots for engagement with the plunger of a tensioner T.

The guide 400 has strong resistance to forces exerted in the direction of the width of the guide, and therefore ensures a stable guide position. The guide 400 completely avoids guide torsion and falling down of the guide, ensures stable travel of the transmission medium, has increased load-bearing capacity, and is compact and capable of substantially improved the compactness of the transmission device in which it is incorporated. As a result a saving of space, and an overall reduction of the size of an engine in which the guide is incorporated, can be achieved.

The principal beneficial effects of the invention may be summarized as follows.

The use of plural reinforcing plates in the guide achieves stable travel of the flexible transmission medium, suppressing widthwise vibration of the flexible transmission medium, and also preventing running of the transmission medium off the guide in the widthwise direction. The plural reinforcing plates also improve the load bearing capacity of the guide, and make it possible to achieve greater compactness in the guide structure and in the overall mechanism in which the guide is incorporated. The stabilization of the guide by the use of plural reinforcing plates also avoids excessive wear at the holes formed in the guide body and in the reinforcing plates at the pivot location.

The provision of aligned mounting holes in the plate-receiving portion of the guide body and in the reinforcing plates prevents the plates from becoming dislodged from the guide body and suppresses vibrational contact between the guide body and the reinforcing plates, which is otherwise produced as a result of movement of a chain, belt or the like along the guide. Furthermore, even if the guide body and a reinforcing plate have different coefficients of thermal expansion, since the reinforcing plates and the guide body are free to move longitudinally relative to each other except at the pivot location, deformation and breakage of the guide are avoided.

In the embodiment in which a tensioner-contacting portion connects the plates to one another and extends across at least a portion of the rearwardly facing surface of the plate-receiving portion, the guide becomes particularly stable and strongly resistant to the effects of widthwise forces.

We claim:

1. A movable guide for a flexible transmission medium comprising an elongated synthetic resin guide body, said guide body including a shoe having a front surface arranged to contact a transmission medium and a back side, and a plate-receiving portion provided on said back side of the shoe and extending along the longitudinal direction of the guide body, said plate-receiving portion having a rearwardly facing surface facing away from said shoe and a plurality of slots also extending along the longitudinal direction of the guide body and having openings in said rearwardly facing surface, said openings also facing away from said shoe, said movable guide having a mounting hole adjacent one end thereof, said hole extending along a pivot axis transverse to the direction of elongation of the guide body, and said guide also including a reinforcing structure comprising a plurality of reinforcing plates respectively fitted into said slots and arranged in parallel to one another along the longitudinal direction of the guide, said reinforcing structure extending outwardly from said slots, beyond the rearwardly facing surface of the plate-receiving portion in said direction facing away from the shoe, at least at a location remote from said one end of the guide, whereby the reinforcing structure can contact the plunger of a tensioner cooperating with said guide at more than one location on said plunger, along a line substantially parallel to said pivot axis.

2. A movable guide according to claim 1, in which said mounting hole comprises a hole in each of said reinforcing plates adjacent one end thereof, and a hole in said plate-receiving portion adjacent one end thereof, said holes in the reinforcing plates and in the plate-receiving portion being aligned with one another when the reinforcing plates are fitted into said slots, whereby said mounting hole can receive a mounting shaft for pivotally mounting said guide.

3. A movable guide according to claim 1, including a tensioner-contacting portion, at said location remote from said one end of the guide, said tensioner-contacting portion connecting said plates to one another and extending across at least a portion of said rearwardly facing surface and beyond said rearwardly facing surface of the plate-receiving portion in said direction facing away from the shoe, at a location remote from said one end of the guide whereby the tensioner-contacting portion can contact the plunger of a tensioner at more than one location on said plunger, along a line substantially parallel to said pivot axis.

4. A movable guide according to claim 3, in which said mounting hole comprises a hole in each of said reinforcing plates adjacent one end thereof, and a hole in said plate-receiving portion adjacent one end thereof, said holes in the reinforcing plates and in the plate-receiving portion being aligned with one another when the reinforcing plates are fitted into said slots, whereby said mounting hole can receive a mounting shaft for pivotally mounting said guide.

* * * * *